US009322682B2

(12) United States Patent
White et al.

(10) Patent No.: US 9,322,682 B2
(45) Date of Patent: Apr. 26, 2016

(54) INSERTABLE FLOW METER

(71) Applicant: Parker-Hannifin Corporation, Cleveland, OH (US)

(72) Inventors: Michael Alton White, Amherst, MA (US); Christopher Templeman, Somerville, MA (US); David Thomas, Hanover, MA (US); Jeffery Gibson, Colorado Springs, CO (US)

(73) Assignee: Parker-Hannifin Corporation, Cleveland, OH (US)

( * ) Notice: Subject to any disclaimer, the term of this patent is extended or adjusted under 35 U.S.C. 154(b) by 47 days.

(21) Appl. No.: 14/335,156

(22) Filed: Jul. 18, 2014

(65) Prior Publication Data

US 2015/0020909 A1    Jan. 22, 2015

Related U.S. Application Data

(60) Provisional application No. 61/847,605, filed on Jul. 18, 2013.

(51) Int. Cl.
*G01F 15/00* (2006.01)
*G01F 1/075* (2006.01)
(Continued)

(52) U.S. Cl.
CPC *G01F 1/075* (2013.01); *F17D 5/00* (2013.01); *G01F 1/0755* (2013.01); *G01F 15/18* (2013.01)

(58) Field of Classification Search
CPC .............. G01F 15/00; G01F 1/05; G01F 1/28
USPC .............................. 73/861.74–861.77, 861.79
See application file for complete search history.

(56) References Cited

U.S. PATENT DOCUMENTS 3,863,806 A * 2/1975 Risser, Jr. ................. G01F 1/10
222/23
3,873,814 A * 3/1975 Mirdadian ................ G01F 3/10
377/21
(Continued)

FOREIGN PATENT DOCUMENTS

EP         0834721 A2    4/1998
WO    WO 01/63221 A1    8/2001
(Continued)

OTHER PUBLICATIONS

Extended European Search Report for corresponding European Patent Application No. 14177215.2-1553, dated Nov. 17, 2014.

*Primary Examiner* — Jewel V Thompson
(74) *Attorney, Agent, or Firm* — Renner, Otto, Boisselle & Sklar LLP

(57) ABSTRACT

A flow meter includes a magnet actuated switch, and an impeller configured to be insertable into a standard NPT ¼" pipe fitting. Rotation of the impeller in response to a fluid flow actuates the magnet actuated switch with a frequency that is proportional to a flow rate of the fluid flow. The impeller has a cylindrical shaft and a plurality of extensions that extend from the cylindrical shaft that form a spiral shaped cross section. Each extension has an inner curved surface and an outer curved surface, and the inner curved surface is concave shaped to catch the flow of the fluid, and the outer curved surface is convex shaped to provide reduced counter resistance to the rotation of the impeller. A pipe section assembly includes a pipe section including a standard NPT ¼" pipe fitting and the flow meter vertically inserted into the pipe fitting.

16 Claims, 6 Drawing Sheets

(51) Int. Cl.
*F17D 5/00* (2006.01)
*G01F 15/18* (2006.01)

(56) References Cited

U.S. PATENT DOCUMENTS

| | | | | |
|---|---|---|---|---|
| 4,122,716 A | * | 10/1978 | Priegel | G01F 1/115 73/114.32 |
| 4,173,144 A | | 11/1979 | Pounder | |
| 4,308,755 A | * | 1/1982 | Millar | G01F 1/115 73/861.77 |
| 4,829,833 A | * | 5/1989 | Feller | G01F 1/106 73/861.77 |
| 4,996,883 A | * | 3/1991 | Feller | G01F 1/056 73/861.33 |
| 6,935,191 B2 | * | 8/2005 | Olivier | B67D 7/20 222/52 |
| 8,448,526 B1 | | 5/2013 | Feller | |
| 8,602,384 B2 | * | 12/2013 | Williamson | G01F 25/00 251/129.01 |
| 2005/0028609 A1 | * | 2/2005 | Langemann | G01F 1/28 73/861.74 |
| 2005/0081642 A1 | * | 4/2005 | Nehl | G01F 1/115 73/861.79 |
| 2005/0279676 A1 | * | 12/2005 | Izzy | B01D 35/04 210/87 |
| 2014/0144249 A1 | * | 5/2014 | Kirchertz | G01D 5/24414 73/861.78 |

FOREIGN PATENT DOCUMENTS

| | | |
|---|---|---|
| WO | WO 2012/085641 A1 | 6/2012 |
| WO | WO 2013/006707 A1 | 1/2013 |

* cited by examiner

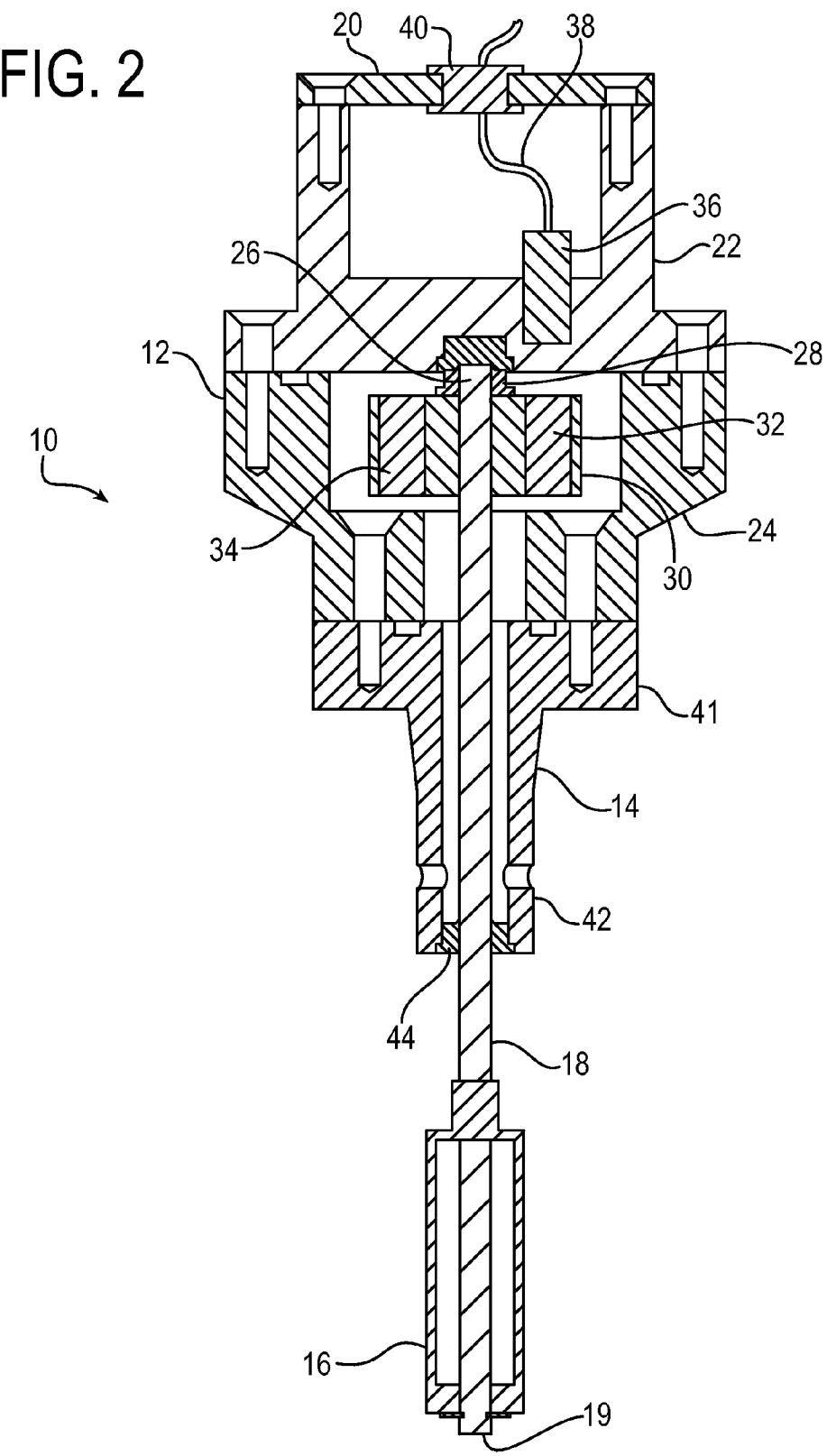

INSERTABLE FLOW METER

RELATED APPLICATION

This application claims the benefit of U.S. Provisional Application No. 61/847,605, filed Jul. 18, 2013, which is incorporated herein by reference.

FIELD OF THE INVENTION

The present invention relates generally to flow meters, and more particularly to flow meters that are insertable into a pipe section to measure fluid velocity through the pipe section.

BACKGROUND OF THE INVENTION

Refueling systems are known in the art, by which fuel is transferred from a fuel source into a fuel consuming device, such as a vehicle. In an example of such system, a refueling vehicle provides a source of fuel for refueling a second vehicle. Refueling vehicles, for example, are commonly used for refueling aircraft. In such systems, fuel is transferred through conduits or pipe sections at a desired flow rate. In conventional refueling systems, a corrected differential pressure device may be inserted into flow paths of the system. A conventional corrected differential pressure device operates by measuring a pressure differential across a vessel in the refueling system. The pressure determinations are used to adjust the flow rate such that should the flow rate drop below the rated vessel flow rate, the pressure may be adjusted so as to achieve the desired flow rate The sensors associated with a conventional correct differential pressure device control adjust the requisite pressure utilizing a flow rate input or determination. The flow rate often is measured using a flow meter. Conventional flow meters employ a rotating member, such as a rotatable fan or similar device, that is inserted longitudinally into a pipe section of the refueling system. The flow rate is measured based on the rate of rotation of the fan caused by the liquid fuel flowing through the pipe section. Because of the requisite size of conventional flow meters, pipe sections often must be specially cut or provided with undesirably large or specially designed fittings. Conventional flow meters, therefore, have proven to be difficult to employ.

As is known in the art, National Pipe Thread Taper (NPT) standards provide standards for tapered threads commonly used on threaded pipes and fittings. In refueling systems, for example, ¼ inch NPT fittings commonly are provided in one or more pipe sections of the system to provide internal access into the pipe section. NPT ¼" pipe fittings may be employed to insert small probes, sensors, and similar monitoring devices into pipe sections for various maintenance and repair purposes. Because of the commonness of NPT ¼" pipe fittings, it would be desirable to utilize such fittings for employing flow meters for use with corrected differential pressure devices. However, sizes and configurations of conventional flow meters are too large or otherwise wrongly shaped to employ conventional flow meters in NPT ¼" pipe fittings. As referenced above, therefore, pipe sections often must be specially cut or provided with undesirably large or specially designed fittings for insertion of conventional flow meters.

SUMMARY OF THE INVENTION

The present invention provides improved flow meter configurations, particularly for use with corrected differential pressure devices in fueling/refueling systems. In contrast to conventional flow meters, the flow meters of the present invention are configured for insertion into a pipe section via standard NPT ¼" pipe fittings. No cutting of pipe sections or specially designed fittings are required. The flow meters are configured to orient an impeller vertically in the pipe section perpendicular to the longitudinal axis or flow direction of the pipe section. The impeller has a spiral shaped cross section, and the extensions of the spiral have enhanced interaction with the flowing liquid as compared to rotating members in conventional flow meters. As a result of such enhanced interaction, the impeller may be thin enough for insertion in a pipe section via a standard NPT ¼" pipe fitting, while still maintaining effective performance in measuring flow rate.

An aspect of the invention, therefore, is a flow meter for measuring the flow of a fluid through a pipe section. In exemplary embodiments, the flow meter includes a magnet actuated switch, and an impeller configured to be insertable into a standard ¼" NPT pipe fitting. Rotation of the impeller in response to a fluid flow actuates the magnet actuated switch with a frequency that is proportional to a flow rate of the fluid flow. The impeller is oriented in a direction perpendicular to a direction corresponding to a direction of the fluid flow. The impeller has a cylindrical shaft and a plurality of extensions that extend from the cylindrical shaft that form a spiral shaped cross section. Each extension has an inner curved surface and an outer curved surface, and the inner curved surface is concave shaped to catch the flow of the fluid, and the outer curved surface is convex shaped to provide reduced counter resistance to the rotation of the impeller.

The flow meter further may include a drive shaft with a first end to which the impeller is connected such that the drive shaft rotates commensurately with the rotation of the impeller, and a second end located adjacent to the magnet actuated switch. The second end of the drive shaft is attached to a flywheel such that the flywheel rotates commensurately with the rotation of the drive shaft. The flywheel has at least one magnet element. As the flywheel wheel rotates, the at least one magnet element passes adjacent the magnet actuated switch, which causes the magnet actuated switch to open and close in an oscillating fashion. The at least one magnet element may include a first magnet element and a second magnet element that are positioned on opposite sides of the flywheel 180 degrees apart relative to an axis of rotation of the flywheel.

Another aspect of the invention is a pipe section assembly. In exemplary embodiments, the pipe section assembly includes a main pipe section and a standard NPT ¼" pipe fitting that extends from the main pipe section, and the described flow meter including a magnet actuated switch and an impeller configured to be insertable into the NPT ¼" pipe fitting. As referenced above, rotation of the spiral shaped impeller in response to a fluid flow through the main pipe section actuates the magnet actuated switch with a frequency that is proportional to a flow rate of the fluid flow through the main pipe section. The drive shaft locates the impeller in an interior of the main pipe section oriented in a direction perpendicular to a direction corresponding to a direction of the fluid flow through the main pipe section. A frequency of actuation of the magnet actuated switch has a linear relationship to the flow rate of the fluid flow through the main pipe section.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIG. 2 is a drawing depicting a cross-sectional view of the flow meter of FIG. 1.

DETAILED DESCRIPTION

Figure 1:
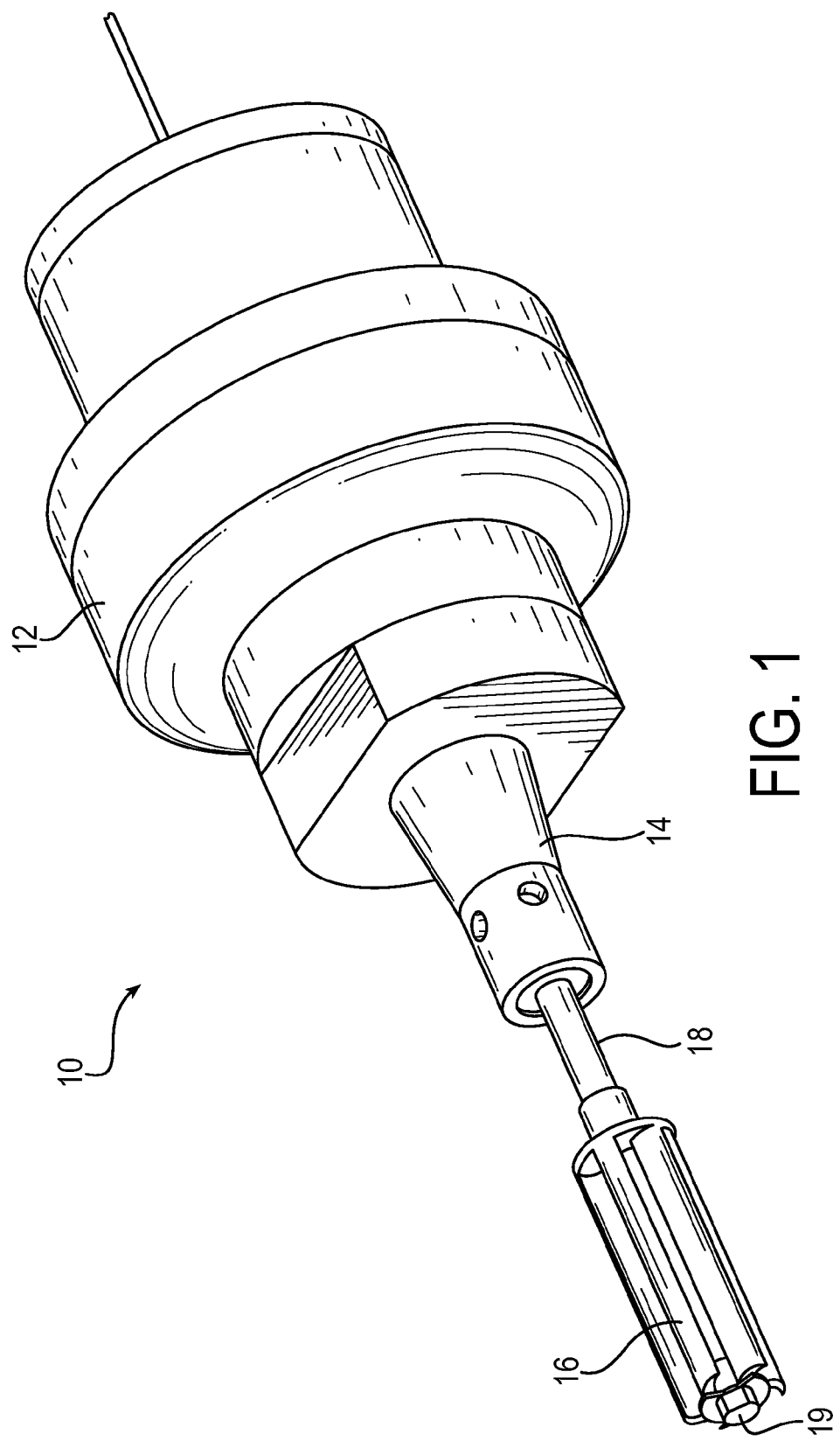
FIG. 1 is drawing depicting an isometric perspective view of an exemplary flow meter in accordance with embodiments of the present invention.

Embodiments of the present invention will now be described with reference to the drawings, wherein like reference numerals are used to refer to like elements throughout. It will be understood that the figures are not necessarily to scale.

FIG. 1 is drawing depicting an isometric perspective view of an exemplary flow meter 10 in accordance with embodiments of the present invention. The flow meter 10 may be characterized as being divided into a sensor body 12, an NPT ¼" thread body 14, and an impeller 16 that is connected to the NPT ¼" thread body via a drive shaft 18. As further explained below, generally the sensor body 12 includes the various sensing elements for determining flow rate through a pipe section. The NPT ¼" thread body 14 is configured for securing the flow meter 10 to a pipe section via a standard NPT ¼" pipe fitting.

An aspect of the invention, therefore, is a flow meter for measuring the flow of a fluid through a pipe section. In exemplary embodiments, the flow meter includes a magnet actuated switch, and an impeller configured to be insertable into a standard NPT ¼" pipe fitting. Rotation of the impeller in response to a fluid flow actuates the magnet actuated switch with a frequency that is relatable to a flow rate of the fluid flow. The frequency in particular may be proportional to the flow rate of the fluid flow. The impeller is oriented in a vertical direction within a pipe section, i.e., oriented in a direction perpendicular to a direction corresponding to a direction of the fluid flow through the pipe section.

As seen in FIG. 1, the impeller 16 is attached to a first end 19 of the drive shaft 18, which are inserted into a pipe section through a standard NPT ¼" pipe fitting. Fluid flowing through the pipe section interacts with extensions of the impeller, causing the impeller to spin. The drive shaft in turn spins with the impeller. Accordingly, the impeller is connected to the first end of the drive shaft such that the drive shaft rotates commensurately with the rotation of the impeller. In a typical example, the fluid may be liquid fuel flow through a pipe section of a refueling system. The spinning of the drive shaft is detected by the sensing elements in the sensor body 12, and the rate of spinning of the drive shaft as detected by the sensing elements is converted into a flow rate of the fluid through the pipe section.

FIG. 2 is a drawing depicting a cross-sectional view of the flow meter 10 of FIG. 1. Accordingly, like reference numerals are utilized to refer to common components in FIGS. 1 and 2. The sensor body 12 may include a sensor body cover 20 that acts as a top cover, which is fastened to a switch housing 22. The switch housing 22 in turn is fastened to a flywheel body 24.

As seen FIG. 2, the drive shaft 18 has a second end 26 that is attached to and extends through the flywheel body 24, and the second end of the drive shaft ends at a base of switch housing 22 adjacent to a magnet actuated switch as further described below. The second end 26 of the drive shaft is rotatably supported at a boundary between the switch housing 22 and flywheel body 24 by a top bearing 28. The second end 26 of the drive shaft is attached to a rotating flywheel 30. The attachment may be achieved, for example, using a snap ring or other suitable connection mechanism. As a result of such connection, the flywheel 30 rotates commensurately with the rotation of the drive shaft 18.

The flywheel 30 provides a housing for at least one magnet element. In the exemplary embodiment of FIG. 2, two magnet elements 32 and 34 are housed within the flywheel, although the precise number of magnet elements may be varied. The magnet elements may be positioned on opposite sides of the flywheel 180 degrees apart relative to the axis of rotation of the flywheel. The use of two magnet elements oppositely positioned has proven to be a suitable configuration, because the opposite two magnets permit a highly balanced rotation of the flywheel for more accurate sensing. The switch housing 22 houses a magnet actuated switch 36 that is actuated by interaction with the magnet elements 32 and 34. A switch output lead 38 extends from the magnet actuated switch through the sensor body cover 20 externally from the flow meter. The magnet actuated switch may be a reed switch as are known in the art, and may be configured as either a normally open switch or a normally closed switch. A sealing grommet 40 may seal the flow meter about the exit location of the switch output lead 38.

Flow sensing is achieved as follows. Fluid flow through a pipe section meets with resistance by the extensions of the impeller 16, which rotates the drive shaft 18. Because the flywheel 30 is connected to the second end of the drive shaft, the flywheel rotates commensurately with the drive shaft. As the flywheel wheel rotates, the magnet elements 32 and 34 pass adjacent the magnet actuated switch 36 in an oscillating fashion. The magnetic fields of the magnet elements thus cause the switch to open and close in an oscillating fashion with each pass of the magnet elements. The result is an oscillatory output of the switch 36 in the form of a square wave, which has a frequency that is proportional to the flow rate of the fluid through the pipe section. The oscillatory or square wave output is transmitted from the flow meter via the switch output lead 38 to an external control device (not shown in the figures). For example, the control device may be a corrected differential pressure device that controls the flow in a refueling system.

Referring again to FIG. 2, the drive shaft 18 extends from the sensor body 12 and through the NPT ¼" thread body 14. The NPT ¼" thread body 14 may include a base 41 that is fastened to a lower end of the flywheel body 24. The base 41 may be configured to include wrench flats that permit the flow meter to be secured to a pipe fitting using conventional wrench type or ratchet tools. The NPT ¼" thread body 14 further may include a connection portion 42 for connecting the flow meter to a standard NPT ¼" pipe fitting. For example, the connection portion 42 of the NPT ¼" thread body 14 may include threads for interfacing with cooperating threads of a standard NPT ¼" pipe fitting. Where the drive shaft 18 exits the NPT ¼" thread body 14, the drive shaft may be supported with a lower bearing 44.

Figure 3A:
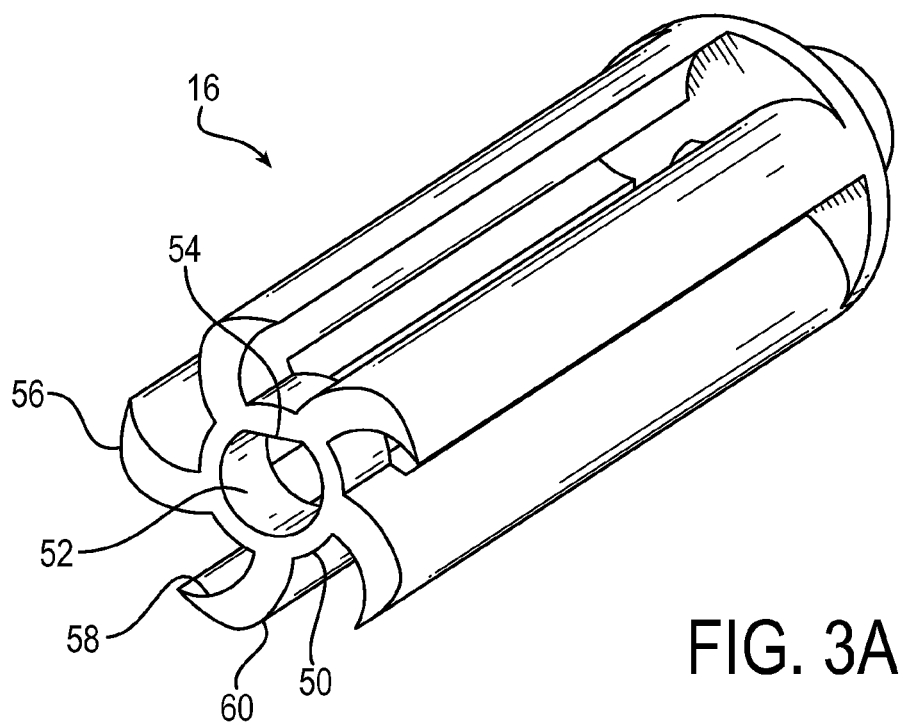
FIG. 3A is a drawing depicting an isometric perspective view of an exemplary impeller for a flow meter in accordance with embodiments of the present invention.
Figure 3B:
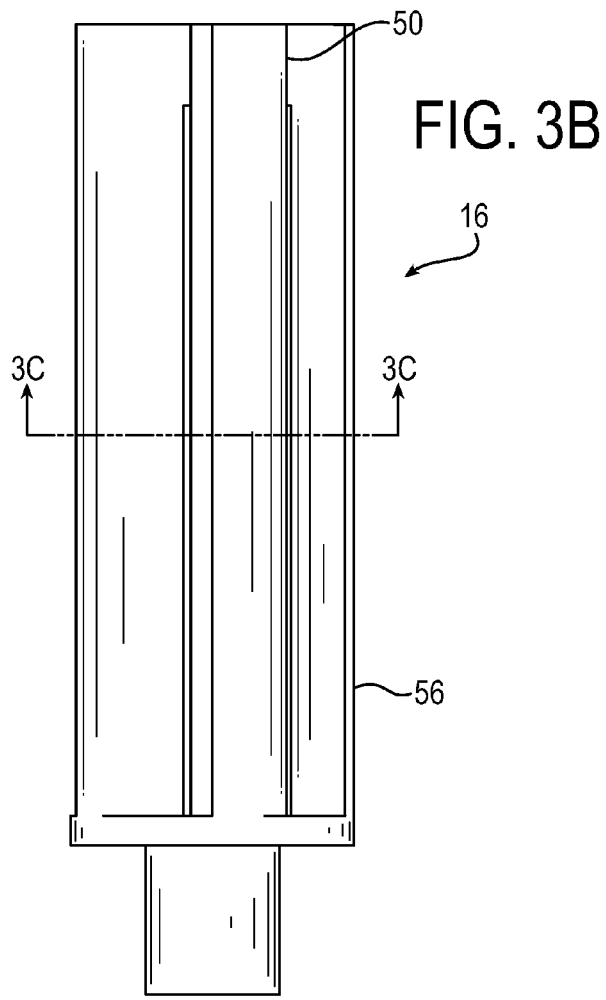
FIG. 3B is a drawing depicting a side view of the exemplary impeller of FIG. 3A.
Figure 3C:
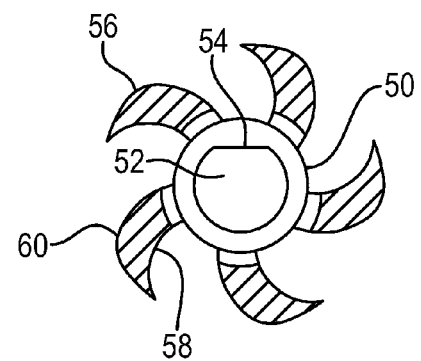
FIG. 3C is a drawing depicting a cross-sectional view of the exemplary impeller along the line A-A of FIG. 3B.

As referenced above, the impeller 16 is connected to the first end 19 of the drive shaft 18. FIGS. 3A-C depict various views of an exemplary impeller 16. In particular, FIG. 3A is a drawing depicting an isometric perspective view of the exemplary impeller 16. FIG. 3B is a drawing depicting a side view of the exemplary impeller of FIG. 3A. FIG. 3C is a drawing depicting a cross-sectional view of the exemplary impeller along the line A-A of FIG. 3B.

The impeller 16 may include a cylindrical shaft 50 that defines a bore hole 52 for receiving the first end 19 of the drive shaft 18. As seen particularly in FIG. 3C, an inner surface 54 of the impeller shaft 50 that defines the bore hole 52 may be keyed or flattened so as to better impart the rotation of the impeller to the drive shaft 18. The impeller may include a plurality of extensions 56 that extend from the cylindrical impeller shaft 50. The extensions 56 are shaped to catch fluid flowing through a pipe extension, which causes the impeller (and thereby the drive shaft) to rotate as described above.

In exemplary embodiments as seen particularly in FIGS. 3A and 3C, the impeller extensions 56 may be configured as spiral shaped extensions that form a spiral shaped cross section for the impeller. Each extension may have an inner curved surface 58 and an outer curved surface 60. The inner surfaces 58 are concave shaped to catch the flow of the fluid in the pipe section. The outer surfaces 60 are convex shaped to provide reduced counter resistance to the rotation of the impeller. With such configuration of the impeller, an enhanced rotation response to fluid flow is achieved with substantially reduced impeller dimensions. In particular, an outer most dimension of the spiral extensions 56 is less than the opening of a standard NPT ¼" pipe fitting. The impeller, therefore, may be inserted through a standard NPT ¼" pipe fitting into a pipe section to measure fluid flow. This obviates the need for cutting pipe sections, or for providing undesirably large or specially designed pipes fittings, as is required for the insertion of conventional flow meters.

Another aspect of the invention, therefore, is a pipe section assembly. In exemplary embodiments, the pipe section assembly includes a main pipe section and a standard NPT ¼" pipe fitting that extends from the main pipe section, and the described flow meter including a magnet actuated switch and an impeller configured to be insertable into the NPT ¼" pipe fitting. As referenced above, rotation of the spiral shaped impeller in response to a fluid flow through the main pipe section actuates the magnet actuated switch with a frequency that is relatable to a flow rate of the fluid flow through the main pipe section. The drive shaft locates the impeller in an interior of the main pipe section oriented in a direction perpendicular to a direction corresponding to a direction of the fluid flow through the main pipe section.

Figure 4:
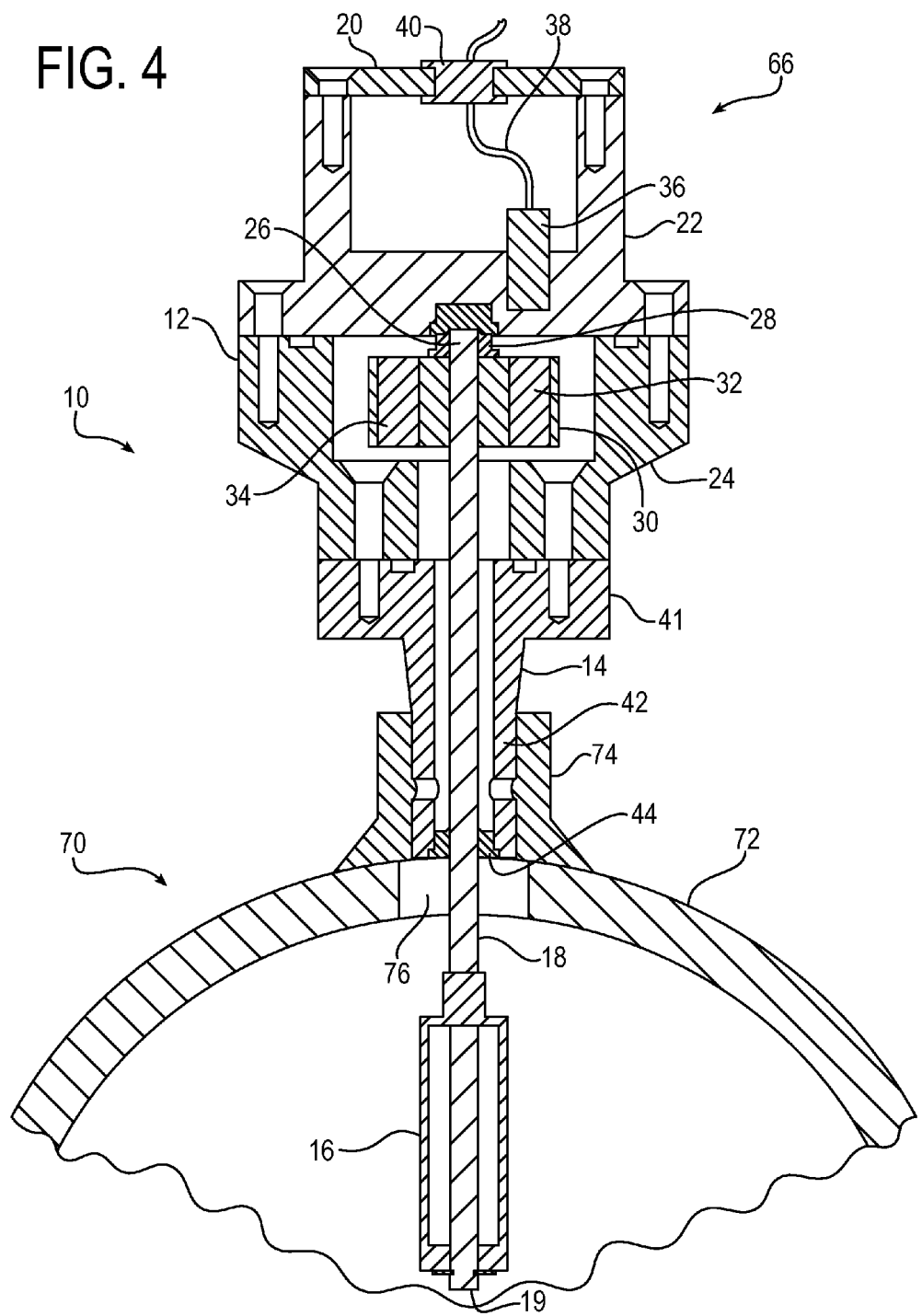
FIG. 4 is a drawing depicting a cross-sectional view of an exemplary pipe section assembly including the exemplary flow meter of FIGS. 1 and 2 inserted into a pipe section in accordance with embodiments of the present invention.

FIG. 4 is a drawing depicting a cross-sectional view of an exemplary pipe section assembly 66 including the exemplary flow meter 10 of FIGS. 1 and 2 inserted into a pipe section 70 in accordance with embodiments of the present invention. Accordingly, like components are identified with common reference numerals in FIG. 4 as in FIGS. 1 and 2. The pipe section 70 includes a main pipe section 72, and a standard NPT ¼" fitting 74 that defines a channel 76 through both the fitting and the main pipe section. The NPT ¼" pipe fitting receives the NPT ¼" thread body 14 of the flow meter 10. In particular, the connection portion 42 of the NPT ¼" thread body 14 extends through the channel 76 of the NPT ¼" fitting 72, with the lower bearing 44 resting essentially at an outer diameter of the main pipe section 72 of the pipe section 70.

With such configuration, the first end 19 of the drive shaft 18, having the impeller 16, extends into the interior of the pipe section 70. The impeller 16 thus is vertically oriented in a direction perpendicular to a longitudinal axis of the pipe section corresponding to the direction of fluid flow. The vertical orientation of the impeller is in contrast to conventional flow meters that are oriented horizontally along the longitudinal axis of the fluid flow. As referenced above, the vertical orientation of the present invention permits the impeller to be configured with a width small enough for insertion through a standard NPT ¼" pipe fitting.

Figure 5:
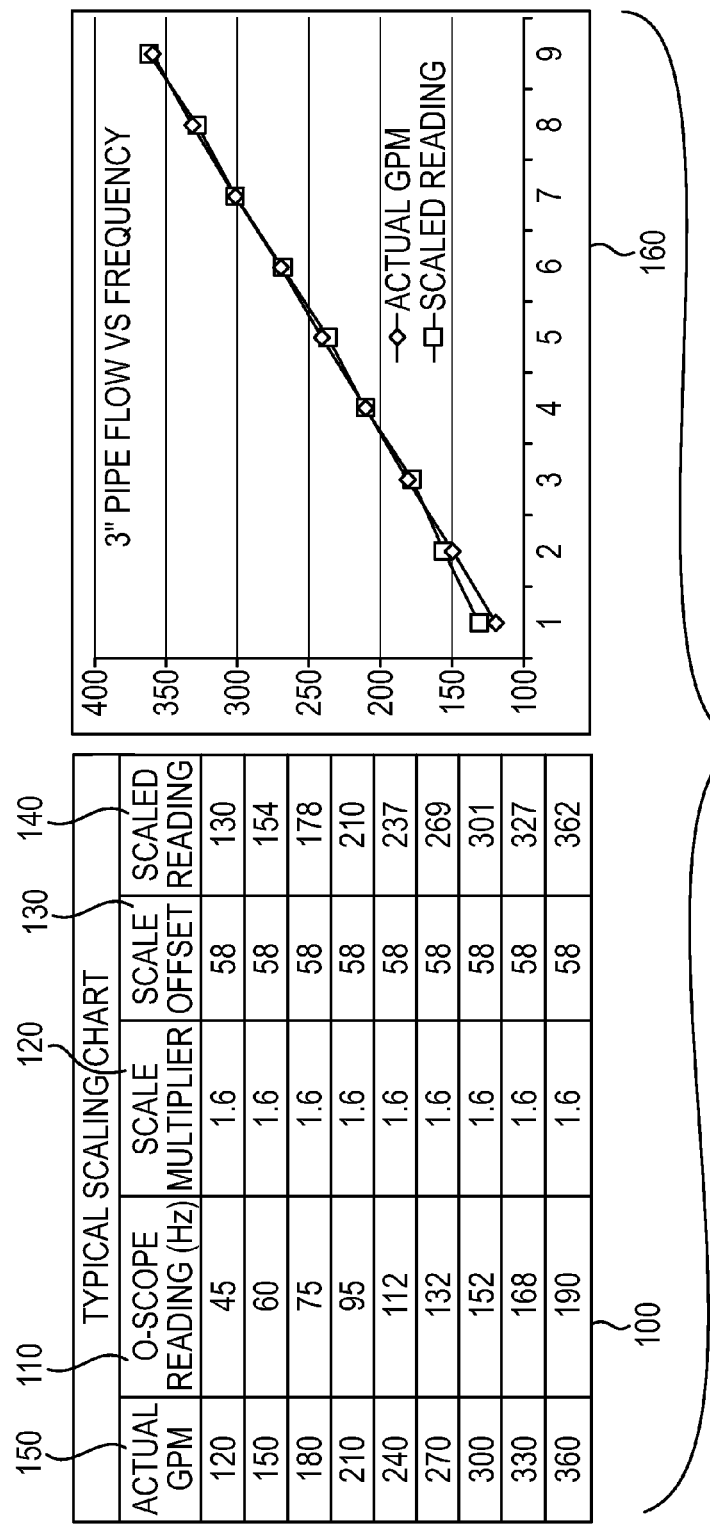
FIG. 5 depicts data relating the measured reading of the flow meter frequency to the actual fluid flow rate.

As described above, the flow meter is employed to sense flow rates by the oscillating frequency by which the magnet elements trigger the magnet actuated switch. The inventors have found that a frequency of actuation of the magnet actuated switch has a linear relationship to the actual flow rate of the fluid flow through the main pipe section. FIG. 5 depicts data relating the measured reading of the frequency in hertz (HZ) of the magnet actuated switch of the flow meter, to the actual fluid flow rate through the pipe section in gallons per minute (GPM). FIG. 5 is an example for a typical three-inch diameter pipe section. The chart 100 on the left side of FIG. 5 shows the manner by which the scope reading 110 in Hz is scaled with a multiplier 120 and offset 130 to arrive at a scaled reading 140. This scaled reading 140 corresponds to a measured actual flow rate 150 through the pipe section in GPM. As expected, the greater the flow rate, the higher the frequency of the oscillations generated by the magnet actuated switch. The graph 160 on the right of FIG. 5 shows a graph of the scaled reading (normalized to an integer scale) related to the actual flow rate GPM. As shown, there is a linear relationship and the scaled reading corresponds to the particular flow rates as seen in the chart.

The data of FIG. 5 may be generated experimentally and then programmed into control mechanisms for flow rate determinations. Although the example of FIG. 5 depicts data for an exemplary three-inch diameter pipe, similar relationships may be generated for other size pipes. Four and six inch diameter pipes are commonly employed, although the invention may be suitable for any pipe section diameter. The inventors further have found that for larger diameter pipes, the drive shaft is lengthened so that the impeller extends further into the interior of the pipe to provide a more accurate measurement of the flow. The longer drive shaft locates the impeller farther away from the pipe section material so that the flow adjacent the pipe section material does not influence the measurement. In exemplary embodiments, the top of the impeller is located at least ten percent of the diameter of the pipe section away from the pipe material.

An aspect of the invention, therefore, is a flow meter. In exemplary embodiments, the flow meter includes a magnet actuated switch, and an impeller configured to be insertable into a standard NPT ¼" pipe fitting. Rotation of the impeller in response to a fluid flow actuates the magnet actuated switch with a frequency that is relatable to a flow rate of the fluid flow.

In an exemplary embodiment of the flow meter, the impeller is oriented in a direction perpendicular to a direction corresponding to a direction of the fluid flow.

In an exemplary embodiment of the flow meter, the impeller has a cylindrical shaft and a plurality of extensions that extend from the cylindrical shaft.

In an exemplary embodiment of the flow meter, the plurality of extensions form a spiral shaped cross section.

In an exemplary embodiment of the flow meter, each extension has an inner curved surface and an outer curved surface, and wherein the inner curved surface is concave shaped to catch the flow of the fluid, and the outer curved surface is convex shaped to provide reduced counter resistance to the rotation of the impeller.

In an exemplary embodiment of the flow meter, the flow meter further includes a drive shaft with a first end to which the impeller is connected such that the drive shaft rotates commensurately with the rotation of the impeller, and a second end located adjacent to the magnet actuated switch.

In an exemplary embodiment of the flow meter, the impeller defines a bore hole for receiving the first end of the drive shaft, and an inner surface of the impeller that defines the bore hole is flattened so as to impart the rotation of the impeller to the drive shaft.

In an exemplary embodiment of the flow meter, the second end of the drive shaft is attached to a flywheel such that the flywheel rotates commensurately with the rotation of the drive shaft, the flywheel has at least one magnet element, and as the flywheel wheel rotates, the at least one magnet element passes adjacent the magnet actuated switch which causes the magnet actuated switch to open and close in an oscillating fashion.

In an exemplary embodiment of the flow meter, the at least one magnet element comprises a first magnet element and a second magnet element positioned on opposite sides of the flywheel 180 degrees apart relative to an axis of rotation of the flywheel.

In an exemplary embodiment of the flow meter, the flow meter further includes a sensor body that houses the magnet actuated switch, and an NPT ¼" thread body that is configured to be secured to a standard NPT ¼" pipe fitting.

Another aspect of the invention is a pipe section assembly. In exemplary embodiments, the pipe section assembly includes a pipe section including a main pipe section and a standard NPT ¼" pipe fitting that extends from the main pipe section, and a flow meter including a magnet actuated switch and an impeller configured to be insertable into the NPT ¼" pipe fitting. Rotation of the impeller in response to a fluid flow through the main pipe section actuates the magnet actuated switch with a frequency that is relatable to a flow rate of the fluid flow through the main pipe section.

In an exemplary embodiment of the pipe section assembly, the impeller is oriented in a direction perpendicular to a direction corresponding to a direction of the fluid flow through the main pipe section.

In an exemplary embodiment of the pipe section assembly, the impeller has a cylindrical shaft and a plurality of extensions that extend from the cylindrical shaft.

In an exemplary embodiment of the pipe section assembly, the plurality of extensions form a spiral shaped cross section.

In an exemplary embodiment of the pipe section assembly, each extension has an inner curved surface and an outer curved, and wherein the inner curved surface is concave shaped to catch the flow of the fluid, and the outer curved surface is convex shaped to provide reduced counter resistance to the rotation of the impeller.

In an exemplary embodiment of the pipe section assembly, the flow meter further includes a drive shaft with a first end to which the impeller is connected such that the drive shaft rotates commensurately with the rotation of the impeller, and a second end located adjacent to the magnet actuated switch.

In an exemplary embodiment of the pipe section assembly, the first end of the drive shaft locates the impeller in an interior of the main pipe section oriented in a direction perpendicular to a direction corresponding to a direction of the fluid flow through the main pipe section.

In an exemplary embodiment of the pipe section assembly, the second end of the drive shaft is attached to a flywheel such that the flywheel rotates commensurately with the rotation of the drive shaft, the flywheel has at least one magnet element, and as the flywheel wheel rotates, the at least one magnet element passes adjacent the magnet actuated switch which causes the magnet actuated switch to open and close in an oscillating fashion.

In an exemplary embodiment of the pipe section assembly, the at least one magnet element comprises a first magnet element and a second magnet element positioned on opposite sides of the flywheel 180 degrees apart relative to an axis of rotation of the flywheel.

In an exemplary embodiment of the pipe section assembly, a frequency of actuation of the magnet actuated switch has a linear relationship to the flow rate of the fluid flow through the main pipe section.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A flow meter comprising:
   a magnet actuated switch; and
   an impeller configured to be insertable into a standard NPT ¼" pipe fitting;
   wherein rotation of the impeller in response to a fluid flow actuates the magnet actuated switch with a frequency that is relatable to a flow rate of the fluid flow; and
   wherein the impeller is oriented in a direction perpendicular to a direction corresponding to a direction of the fluid flow.

2. The flow meter of claim 1, wherein the impeller has a cylindrical shaft and a plurality of extensions that extend from the cylindrical shaft.

3. The flow meter of claim 2, wherein the plurality of extensions form a spiral shaped cross section.

4. The flow meter of claim 3, wherein each extension has an inner curved surface and an outer curved surface, and wherein the inner curved surface is concave shaped to catch the flow of the fluid, and the outer curved surface is convex shaped to provide reduced counter resistance to the rotation of the impeller.

5. A flow meter comprising:
a magnet actuated switch;
an impeller configured to be insertable into a standard NPT ¼" pipe fitting;
wherein rotation of the impeller in response to a fluid flow actuates the magnet actuated switch with a frequency that is relatable to a flow rate of the fluid flow; and
a drive shaft with a first end to which the impeller is connected such that the drive shaft rotates commensurately with the rotation of the impeller, and a second end located adjacent to the magnet actuated switch;
wherein:
the second end of the drive shaft is attached to a flywheel such that the flywheel rotates commensurately with the rotation of the drive shaft;
the flywheel has at least one magnet element; and
as the flywheel wheel rotates, the at least one magnet element passes adjacent the magnet actuated switch which causes the magnet actuated switch to open and close in an oscillating fashion.

6. The flow meter of claim 5, wherein the at least one magnet element comprises a first magnet element and a second magnet element positioned on opposite sides of the flywheel 180 degrees apart relative to an axis of rotation of the flywheel.

7. The flow meter of claim 1, further comprising a sensor body that houses the magnet actuated switch, and an NPT ¼" thread body that is configured to be secured to a standard NPT ¼" pipe fitting.

8. A pipe section assembly comprising:
a pipe section including a main pipe section and a standard NPT ¼" pipe fitting that extends from the main pipe section; and
a flow meter comprising a magnet actuated switch and an impeller configured to be insertable into the NPT ¼" pipe fitting;
wherein rotation of the impeller in response to a fluid flow through the main pipe section actuates the magnet actuated switch with a frequency that is relatable to a flow rate of the fluid flow through the main pipe section; and
wherein the impeller is oriented in a direction perpendicular to a direction corresponding to a direction of the fluid flow through the main pipe section.

9. The pipe section assembly of claim 8, wherein the impeller has a cylindrical shaft and a plurality of extensions that extend from the cylindrical shaft.

10. The pipe section assembly of claim 9, wherein the plurality of extensions form a spiral shaped cross section.

11. The pipe section assembly of claim 10, wherein each extension has an inner curved surface and an outer curved, and wherein the inner curved surface is concave shaped to catch the flow of the fluid, and the outer curved surface is convex shaped to provide reduced counter resistance to the rotation of the impeller.

12. A pipe section assembly comprising:
a pipe section including a main pipe section and a standard NPT ¼" pipe fitting that extends from the main pipe section; and
a flow meter comprising a magnet actuated switch and an impeller configured to be insertable into the NPT ¼" pipe fitting;
wherein rotation of the impeller in response to a fluid flow through the main pipe section actuates the magnet actuated switch with a frequency that is relatable to a flow rate of the fluid flow through the main pipe section; and
wherein the flow meter further comprises a drive shaft with a first end to which the impeller is connected such that the drive shaft rotates commensurately with the rotation of the impeller, and a second end located adjacent to the magnet actuated switch;
further wherein:
the second end of the drive shaft is attached to a flywheel such that the flywheel rotates commensurately with the rotation of the drive shaft;
the flywheel has at least one magnet element; and
as the flywheel wheel rotates, the at least one magnet element passes adjacent the magnet actuated switch which causes the magnet actuated switch to open and close in an oscillating fashion.

13. The pipe section assembly of claim 12, wherein the at least one magnet element comprises a first magnet element and a second magnet element positioned on opposite sides of the flywheel 180 degrees apart relative to an axis of rotation of the flywheel.

14. The pipe section assembly of claim 8, wherein a frequency of actuation of the magnet actuated switch has a linear relationship to the flow rate of the fluid flow through the main pipe section.

15. The flow meter of claim 5, wherein the impeller defines a bore hole for receiving the first end of the drive shaft, and an inner surface of the impeller that defines the bore hole is flattened so as to impart the rotation of the impeller to the drive shaft.

16. The pipe section assembly of claim 12, wherein the first end of the drive shaft locates the impeller in an interior of the main pipe section oriented in a direction perpendicular to a direction corresponding to a direction of the fluid flow through the main pipe section.

* * * * *